United States Patent
Ferguson et al.

(10) Patent No.: US 7,906,868 B2
(45) Date of Patent: Mar. 15, 2011

(54) FINE TUNED MULTIPLE OUTPUT CONVERTER

(75) Inventors: Bruce Ferguson, Anaheim, CA (US); Paul Okada, Foothill Ranch, CA (US)

(73) Assignee: Microsemi Corporation, Garden Grove, CA (US)

( * ) Notice: Subject to any disclaimer, the term of this patent is extended or adjusted under 35 U.S.C. 154(b) by 212 days.

(21) Appl. No.: 12/340,717

(22) Filed: Dec. 21, 2008

(65) Prior Publication Data

US 2009/0179491 A1    Jul. 16, 2009

Related U.S. Application Data

(60) Provisional application No. 61/021,038, filed on Jan. 15, 2008.

(51) Int. Cl.
*H02J 3/14* (2006.01)
(52) U.S. Cl. .......................................... 307/31
(58) Field of Classification Search .................. 307/31; 363/16–21.17, 56.09–56.11, 97, 131
See application file for complete search history.

(56) References Cited

U.S. PATENT DOCUMENTS

| | | | |
|---|---|---|---|
| 5,768,118 A * | 6/1998 | Faulk et al. ................. | 363/72 |
| 5,920,466 A | 7/1999 | Hirahara | |
| 5,949,658 A | 9/1999 | Thottuvelil et al. | |
| 6,369,525 B1 | 4/2002 | Chang et al. | |
| 6,504,267 B1 | 1/2003 | Giannopoulos | |
| 6,507,159 B2 | 1/2003 | Muthu | |
| 6,529,182 B1 | 3/2003 | Burton | |
| 6,621,235 B2 | 9/2003 | Chang | |
| 7,463,497 B2 * | 12/2008 | Negrete ................. | 363/21.13 |
| 7,471,522 B2 * | 12/2008 | Ng et al. ................ | 363/21.12 |
| 2003/0025120 A1 | 2/2003 | Chang | |
| 2006/0022607 A1 | 2/2006 | Hsu | |
| 2006/0119185 A1 | 6/2006 | Steigerwald et al. | |
| 2006/0208719 A1 | 9/2006 | Librizzi | |
| 2006/0234779 A1 | 10/2006 | Haener et al. | |
| 2007/0159421 A1 | 7/2007 | Peker et al. | |

FOREIGN PATENT DOCUMENTS

EP       0698959 B1    2/2000

* cited by examiner

*Primary Examiner* — Albert W Paladini
(74) *Attorney, Agent, or Firm* — Simon Kahn

(57) ABSTRACT

A secondary side voltage regulation scheme applied to a multiple output flyback converter. The output with the highest error voltage is selected to control the primary switch. The remaining outputs are regulated by varying the length of time that current is allowed to flow into each output by controlling the on time of a switch connected in series with each of the outputs. The switching of the windings is achieved using a single N channel MOSFET for each output. Regulation of the outputs is performed using leading edge modulation. The body diode of the output MOSFET switches are held off during the start of the commutation period by the use of an active clamp on the primary side.

16 Claims, 4 Drawing Sheets

FINE TUNED MULTIPLE OUTPUT CONVERTER

CROSS-REFERENCE TO RELATED APPLICATIONS

This application claims priority from U.S. Provisional Patent Application Ser. No. 61/021,038 filed Jan. 15, 2008 of the same name, the entire contents of which is incorporated herein by reference.

TECHNICAL FIELD

The present invention relates to DC/DC converters and more particularly, to a secondary side regulated converter with a primary side active clamp.

BACKGROUND

A flyback converter is a DC/DC converter with galvanic isolation between the input and the output or outputs. Specifically, the flyback converter is a buck-boost converter with the inductor split to form a transformer, having a primary side winding and secondary side windings exhibiting opposing winding directions. In a typical flyback arrangement, the secondary circuit uses a blocking diode to ensure that current flows in the secondary only when the primary switch is open.

Flyback converters with multiple outputs are known in the art. Each of the outputs is driven by a secondary winding electromagnetically interacting with the primary winding and a dedicated blocking diode. The output voltage of each secondary is provided across an output filter capacitor to a load. Variations in the output load current, voltage drops in the transformer and blocking diode, and non-ideal transformer turns-ratios require that the output voltage be actively regulated to maintain a constant level. In one embodiment, primary side regulation is used to control one of the output voltages by feeding back a control signal representative of the quantity to be controlled, and comparing the quantity to be controlled with a predetermined reference. The difference is used to control the primary side switch so as to bring the particular output in line with the predetermined reference. The remaining outputs track the regulated output as determined by the turns-ratio of the transformer; however they are not tightly regulated, particularly over a range of loads.

Primary side regulation cannot control each of the secondary outputs independently, therefore secondary side regulation is often provided. In secondary side regulation known to the prior art, also known interchangeably as secondary side post regulation, an electronically controlled switch is provided in series with the blocking diode of each of the secondaries. The switch is then controlled so as to regulate the associated secondary output voltage.

U.S. Pat. No. 6,369,525 issued Apr. 9, 2002 to Chang et al, and U.S. patent application Ser. No. 11/621,160 to Peker et al, entitled "Secondary Side Post Regulation for LED Backlighting", filed Jan. 9, 2007 and published Jul. 12, 2007 as U.S. Patent Application Publication S/N 2007/0459421 A1, the entire contents of each of which is incorporated herein by reference, are addressed to flyback converters which provide multiple independently regulated outputs. The secondary side switches each exhibit a blocking diode in series therewith to prevent reverse current flow through the inherent body diode of the MOSFET switch. With low output voltages the forward voltage drop across the blocking diode becomes a significant factor which limits the operating efficiency of the converter.

European Patent S/N EP 0698959 A1, to Siemens, published Aug. 4, 1995, the entire contents of which is incorporated herein by reference, is addressed to a DC/DC voltage converter with a plurality of controlled secondaries. In one embodiment the electronically controlled switch comprises an inherent valve section to perform the blocking diode functionality. Unfortunately, the requirement for such an inherent valve section prevents the use of low cost MOSFET devices without providing for an additional blocking diode.

What is needed, and not provided by the prior art, is a secondary side post regulation scheme allowing for use of a MOSFET electronically controlled switch without requiring a blocking diode.

SUMMARY

In view of the discussion provided above and other considerations, the present disclosure provides methods and apparatus to overcome some or all of the disadvantages of prior and present power management systems and methods. Other new and useful advantages of the present methods and apparatus will also be described herein and can be appreciated by those skilled in the art.

This is accomplished in certain embodiments by dynamically selecting the output with the largest error voltage to control the primary switch. The remaining outputs are regulated by varying the length of time that current flows into each output by controlling a switch connected in series with each of the outputs. Regulation of the outputs is performed using leading edge modulation, with all secondary switches turned off prior to closing the primary switch. Additionally an active clamp is provided on the primary side to prevent the voltage spike at the primary, occurring responsive to opening the primary switch, from driving current through the inherent body diodes of the secondary switches. The combination of leading edge modulation and the primary side active clamp advantageously enables the use of MOSFET switches without an additional blocking diode.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Figure 1:
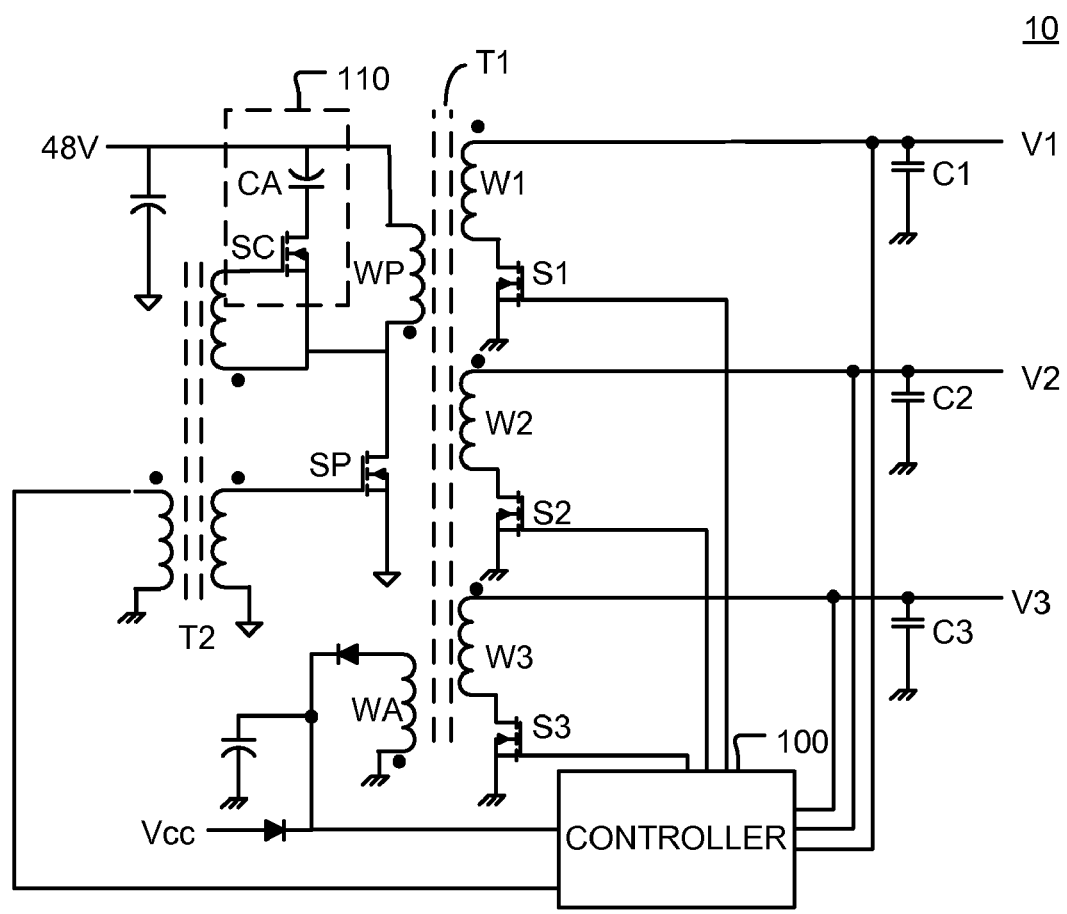
FIG. 1 illustrates a high level schematic diagram of a flyback converter exhibiting a controller according to an exemplary embodiment.

Before explaining at least one embodiment in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. The term connected as used herein is not meant to be limited to a direct connection, and the use of appropriate resistors, capacitors and inductors does not exceed the scope thereof.

In electronic circuit diagrams, conventional electronic components are labeled with conventional reference letters followed by a number indication the iteration of that element in the circuit. For example, R indicates a resistor, C indicates a capacitor, T indicated a transformer, A indicates an amplifier (that may be configured in several ways such as a comparator, differential amplifier and the like) M indicates a Metal Oxide Substrate Field Effect Transistor (MOSFET) and S indicates a switch that may be implemented as a MOSFET. Each electronic component has a plurality of terminals or ends (inputs and outputs) through which it is connected to wires and other components. However the use of the word 'terminal', 'end', 'input' or 'output' does not imply an implementation based on discrete components only, and any circuit described may be implemented as an integrated circuit (IC).

The present embodiments provide secondary side voltage regulation for a multiple output flyback DC/DC converter. In one embodiment the output with the largest error voltage is dynamically selected to be regulated by the primary switch. The remaining outputs are regulated by varying the length of time that current flows into each output by controlling a switch connected in series with each of the outputs.

Preferably, the switching of the windings is achieved using a single N channel MOSFET for each output. Regulation of the outputs is performed using leading edge modulation. The body diode of the output MOSFET switches are held off immediately after the primary switch turns off by the use of an active clamp on the primary side.

FIG. 1 illustrates a high level schematic diagram of a flyback converter 10 comprising a first transformer T1 having a primary winding WP and a plurality of secondary windings denoted respectively W1, W2, and W3. A first end of each secondary winding W1, W2, and W3 is connected to a respective secondary output denoted V1, V2, and V3, developed across a respective output filter capacitor C1, C2 and C3. Each of V1, V2, and V3 is fed to a respective input of a controller 100. A second end of each secondary winding W1, W2, and W3 is connected in series to a first common point, in one embodiment the common point being ground, via a respective secondary switch S1, S2 and S3, each illustrated as an N channel MOSFET. Each secondary switch S1, S2 and S3 is controlled by a respective output of controller 100 connected to its gate. A first end of primary winding WP is connected to a power source, illustrated without limitation as +48 volts DC provided across an input capacitor. An active clamp 110 is implemented by a capacitor CA and a switch SC arranged so that when switch SC is closed capacitor CA is placed across primary winding WP. A second end of primary winding WP is connected in series to a second common point, via a primary switch SP, in one embodiment the second common point being different than the first common point, and commonly known as primary side ground. Primary switch SP is operatively associated with and coupled to controller 100 via a gate drive isolation transformer T2, with the gate of primary switch SP connected to a first secondary winding of gate drive isolation transformer T2. The primary winding of gate drive isolation transformer T2 is connected to a primary switch drive output of controller 100. An additional secondary winding of isolation transformer T2 is connected to drive the gate of switch SC in a complementary manner to SP. In another embodiment (not shown), the functionality of gate drive isolation transformer T2 is replaced with an opto-coupler without exceeding the scope.

Power for controller 100 is supplied from a power source, illustrated as Vcc, or from an auxiliary primary winding WA in phase with primary winding WP. Diodes are provided to select whichever power source has the highest voltage. Advantageously, by providing auxiliary primary winding WA in phase with primary winding WP, when the primary switch is turned on auxiliary primary winding WA will produce a voltage that is proportional to the primary voltage.

According to a preferred embodiment, each secondary switch S1, S2 and S3, is implemented by a single MOSFET transistor without requiring a separate blocking diode, implemented in the embodiment shown as an N channel MOSFET, without being limiting in any way. In an alternative embodiment a P channel MOSFET is implemented without exceeding the scope. Typically, an N channel MOSFET can block current flow thoroughly in the drain-to-source direction but is limited in blocking current in the source-to-drain direction due to its body diode. When secondary switches S1, S2 and S3 are turned off by lowering the gate-source voltage, these switches can be relied upon to block current flow in the source-to-drain direction as long as the voltage in the source-to-drain direction is held by the reflected voltage of primary side active clamp 110 to less than the inherent body diode forward bias voltage. Each MOSFET implementation of secondary switches S1, S2 and S3 is oriented such that the inherent body diode is reverse biased when primary switch SP is turned on and the respective secondary switch S1, S2, S3 is turned off, thereby preventing reverse current flow. When the secondary switches are turned on and the primary switch is turned off, the voltage drop across the secondary side switches is lower than the blocking diode voltage drop of the prior art thereby improving efficiency by eliminating the power wasted in the blocking diode.

Secondary side voltage regulation is accomplished in the embodiment of FIG. 1 by the operation of active clamp 110 and leading edge pulse width modulation provided by controller 100. In particular, in flyback converters when the primary switch turns off there is a large reverse voltage spike produced on the primary of the transformer as the primary leakage inductance discharges. This reverse voltage spike is reflected to the secondary side, where the inherent body diodes of secondary switches S1, S2 and S3 would be forward biased by the reflected spike. In order to prevent the voltage spike on primary winding WP, active clamp 110 is arranged to maintain a relatively constant voltage across primary winding WP thereby preventing reverse current through the inherent body diodes of secondary switches S1, S2 and S3.

Capacitor CA of active clamp 110 preferably comprises a large value capacitor. As described above, when primary switch SP is conducting active clamp switch SC is open and when primary switch SP is open, active clamp switch SC is closed thereby connecting capacitor CA in parallel across primary winding WP. Capacitor CA is selected such that the voltage across capacitor CA does not appreciably change during the period when primary switch SP is open. Thus, active clamp 110 fixes the voltage across primary winding WP when primary switch SP is turned off. When primary switch SP turns off the voltage on primary winding WP is determined by the turns ratio of primary winding WP to the secondaries W1, W2 and W3, and as indicated above the voltage spike is prevented by the operation of active clamp 110. Active clamp 110 further acts to ensure a respective constant voltage at each of the outputs V1, V2 and V3 when the primary side electronically controlled switch is open, with the respective constant voltages being a function of the turns ratio of the respective secondary.

When primary switch SP turns on, energy is stored in transformer T1 and builds in the leakage inductance of primary winding WP. When primary switch SP turns off, the leakage inductance in each of secondary windings W1, W2 and W3 prevents immediate current flow in secondary windings W1, W2 and W3, and the energy stored in the core and in the primary leakage inductance flows into active clamp 110. This increases the clamp voltage slightly. When secondary switches S1, S2 and S3 close, current flows in the secondary outputs and the current flowing into active clamp 110 begins to decrease, and its voltage drops slightly, such that at the end of the switch cycle of primary switch SP, current is flowing out of active clamp 110 returning energy absorbed when primary switch SP was initially shut off.

Figure 2:
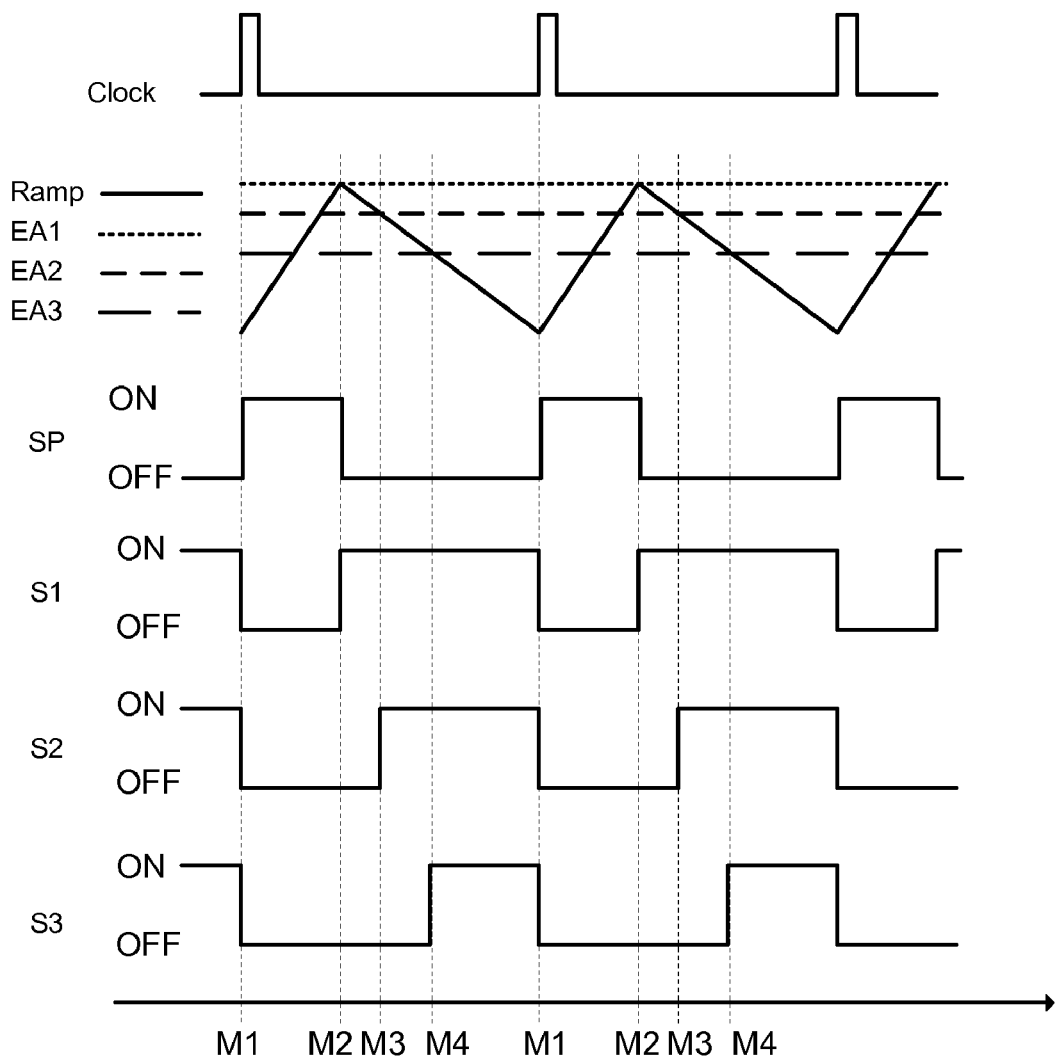
FIG. 2 illustrates a timing diagram illustrating the timing scheme as regulated by the controller of FIG. 1 according to an exemplary embodiment.

Controller 100 is arranged to control primary switch SP, and secondary switches S1, S2 and S3 in a leading edge modulation scheme as depicted in the lower part of the timing diagram in FIG. 2 in which the x-axis indicates time and the y-axis indicates amplitude of the control input of the respective switch. In particular, each of primary switch SP and secondary switches S1, S2 and S3 are closed when the respective signal is high. According to the leading edge modulation scheme, all secondary switches S1, S2 and S3 turn off at the same time, as shown at time mark M1, but they turn on at staggered times depending on their duty cycle, illustrated as time marks M2, M3 and M4. Secondary switches S1, S2 and S3 are turned off just prior to the end of the commutation period, i.e. the turn on of primary switch SP, as shown at time mark M1. When primary switch SP turns on all secondary voltages are immediately reversed and there is no significant period of time when the body diode of the MOSFET switch implementation of secondary switches S1, S2 and S3 conducts.

Figure 3:
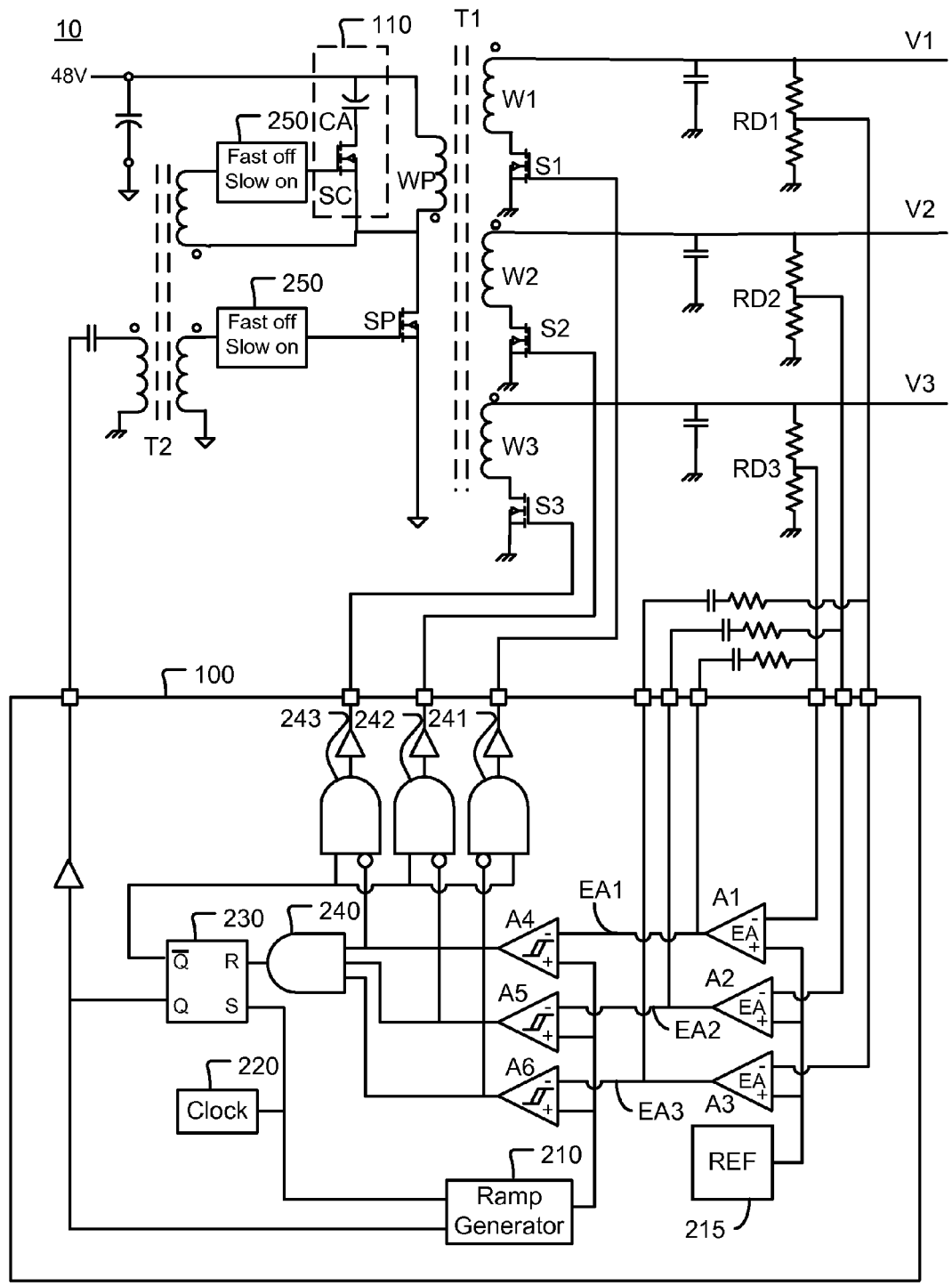
FIG. 3 illustrates a high level schematic diagram of an electronic circuit showing in further detail the flyback converter of FIG. 1 according to an exemplary embodiment.

FIG. 3 illustrates a high level schematic diagram of an electronic circuit showing in further detail flyback converter 10 of FIG. 1. Controller 100 is arranged to dynamically detect the output with the largest error voltage and select that error voltage to control the duty cycle of primary switch SP. The secondary switch associated with the largest error voltage is on for the full duration of the off time of the primary switch. Controller 100 produces the above-mentioned leading edge modulation.

Specifically each output, denoted V1, V2 and V3 and developed across a respective output capacitor, is associated with, and connected to a first end of, a respective secondary winding W1, W2 and W3 of a first transformer T1. A second end of secondary winding W1 is connected to a first common point, in one embodiment the common point being ground, via a secondary switch S1, a second end of secondary winding W2 is connected to the first common point via a secondary switch S2 and second end of secondary winding W3 is connected to the first common point via a secondary switch S3. Each of secondary switches S1, S2 and S3 are illustrated, without limitation, as an N channel MOSFET.

Each of V1, V2 and V3 are connected via a respective voltage divider network RD1, RD2 and RD3 to an inverting input of a respective error amplifier A1, A2 and A3. The non-inverting input of each of error amplifiers A1, A2 and A3 are connected to the output of fixed reference voltage 215. Thus, a received voltage representation of each of V1, V2 and V3 is compared to a predefined reference voltage by a respective error amplifier. In order to support different output voltages for V1, V2 and V3, the respective voltage dividers RD1, RD2 and RD3 are arranged to present a voltage equal to the predefined reference voltage when the nominal design voltage appears at the respective output. The output of each error amplifier A1, A2, A3 is thus positive when the respective output voltage V1, V2, V3 is less than the nominal design voltage, with an amplitude reflective of the difference between the nominal design voltage and the output voltage.

The output of error amplifier A1, denoted EA1, is fed to the inverting input of a comparator A4, the output of error amplifier A2, denoted EA2, is fed to the inverting input of a comparator A5 and the output of error amplifier A3, denoted EA3, is fed to the inverting input of a comparator A6. The non-inverting input of comparators A4, A5 and A6 are connected the output of a ramp voltage generator 210. Ramp voltage generator 210 is connected to an output of a clock 220, and is responsive thereto. The set input of an S/R latch 230 is also connected to the output of clock 220.

The Q output of S/R latch 230 is connected to an input of ramp voltage generator 210, and via a buffer and a capacitor to a primary winding of a second transformer T2, implemented as an isolation transformer. A first secondary winding of second transformer T2 is connected via a fast off/slow on functionality 250 to the control input of primary switch SP. A second secondary winding of second transformer T2 is connected in a complementary manner via a fast off/slow on functionality 250 to the control input of a switch SC of an active clamp 110. One end of primary winding WP of first transformer T1 is connected to a power source, illustrated without limitation as +48 volts DC provided across an input capacitor. Active clamp 110 is implemented by a capacitor CA and switch SC arranged so that when switch SC is closed capacitor CA is placed across primary winding WP. The other end of primary winding WP is connected in series to a second common point, via primary switch SP, the second common point being in one embodiment different than the first common point, and commonly known as primary side ground.

The outputs of each of comparators A4, A5 and A6 are connected to a respective input of an AND gate 240 and to an inverting input of a respective one of AND gates 241, 242 and 243. The output of AND gate 240 is connected to the reset input of S/R latch 230. The Q-bar output of S/R latch 230 is connected to an input of each of AND gates 241, 242 and 243. The output of AND gate 241 is connected via a buffer to the control input of secondary switch S1, the output of AND gate 242 is connected via a buffer to the control input of secondary switch S2 and the output of AND gate 243 is connected via a buffer to the control input of secondary switch S3.

The operation of the embodiment of FIG. 3 is understood in cooperation with the signal waveforms of FIG. 2, with the x-axis representing time and the y-axis representing voltage in arbitrary units. The upper part of FIG. 2 illustrates the clock signal output by clock 220, the ramp signal voltage output by ramp voltage generator 210 responsive thereto, and the error amplifier outputs EA1, EA2 and EA3. The ramp signal voltage starts to increase when it receives a positive clock pulse, as shown at time mark M1. The positive clock pulse output by clock 220 also sets S/R latch 230 whose output is operatively connected to turn on primary switch SP via fast off/slow on functionality 250. When primary switch SP is on, the Q-bar output of latch 230 is low, and thus keeps all three secondary switches S1, S2, S3 off via the respective AND gates 241, 242 and 243.

The climbing ramp voltage output by ramp voltage generator 210 is compared to the error amplifier outputs EA1, EA2 and EA3 by comparators A4, A5 and A6, respectively. When the ramp voltage exceeds the respective error amplifier output EA1, EA2 and AE3, the output of the respective comparator A4, A5 and A6 becomes high. The amplitude of EA1, EA2 and EA3 reflect the output voltage error of V1, V2 and V3, and thus the respective comparator A4, A5 and A6 associated with the largest error of is the last to turn positive.

When the last comparator of comparators A4, A5 and A6 turns positive, as shown at time mark M2, the output of AND gate 240 becomes positive which resets S/R latch 230. The Q output of S/R latch 230 goes low, thereby turning off primary switch SP and turning on active clamp 110. When latch 230 changes state it also causes the ramp voltage output by ramp generator 210 to begin decreasing, since the Q output of S/R latch is connected to the directional input of ramp generator 210. The Q-bar output simultaneously goes high thereby enabling each of AND gates 241, 242 and 243. The decreasing ramp voltage of ramp signal generator 210 crosses each of error amplifier output EA1, EA2 and EA2, and the respective output of comparator A4, A5, A6 becomes negative turning on a respective one of secondary switches S1, S2 and S3 via the pass through of the respective AND gate 241, 242, 243.

Almost as soon as the ramp changes slope, as shown at time mark M2, the last comparator to turn positive, i.e. the comparator associated with the largest error value, changes state again which turns on the corresponding output's secondary switch. As the ramp voltage continues to decrease, the remaining secondary switches are turned on by their respective comparators as the ramp voltage becomes less than the error voltage for that output, as depicted at time marks M3 and M4. The secondary switches remain on until the next clock pulse occurs as shown at time mark M1, which again resets latch 230 and changes the slope of the ramp voltage of ramp generator 210. Ramp generator 210 is preferably arranged such that it creates a down slope that just reaches the original starting point when the clock cycle occurs.

Fast off/slow on functionality 250 is implemented in one embodiment via a diode and resistor in parallel arranged to pull voltage away from the gate of the respective switch without delay, and delay the turn on of the respective switch. Fast off/slow on functionality 250 is preferred so as to avoid primary switch SP and clamp switch SC from being on at the same time.

According to one embodiment of the invention (not shown), in order to achieve over current protection, the current in secondary switches S1, S2 and S3 is sensed. This current is sensed responsive to the voltage drop across the MOSFET, which is a function of current and RDSon, i.e. the resistance between the source and the drain when the MOSFET is on. In such an embodiment, the current is sensed just prior to the switch turning off and thus represents usually the peak current in the secondary switch. The current sensing input is ignored if the switch is not turned on during any cycle.

When an over current condition is sensed on one or more outputs and the over current condition is sustained for 8 clock cycles, the over current detection circuit will initiate a power on reset including a soft start. If at any time during the restart sequence, an over current fault is encountered, the power on reset cycle is re-initiated.

According to one embodiment of the invention, controller 100 is provided with an independent power supply. This may be implemented as a tiny isolation transformer that runs from a free running primary side oscillator. It can also be a double pole switch.

Advantageously, the controller according to the present embodiments attempts to service all the outputs simultaneously such that the peak current in any particular output switch is related only to the load current on that output and is not affected by the load currents on the other outputs.

Another advantage is that the implementation according to some embodiments requires only one switch per output. This means that providing regulation of multiple outputs does not have any associated cost other than the addition of controller 100.

Preferably controller 100 is configured to be used in power over Ethernet systems applications but is not limited thereto.

Figure 4:
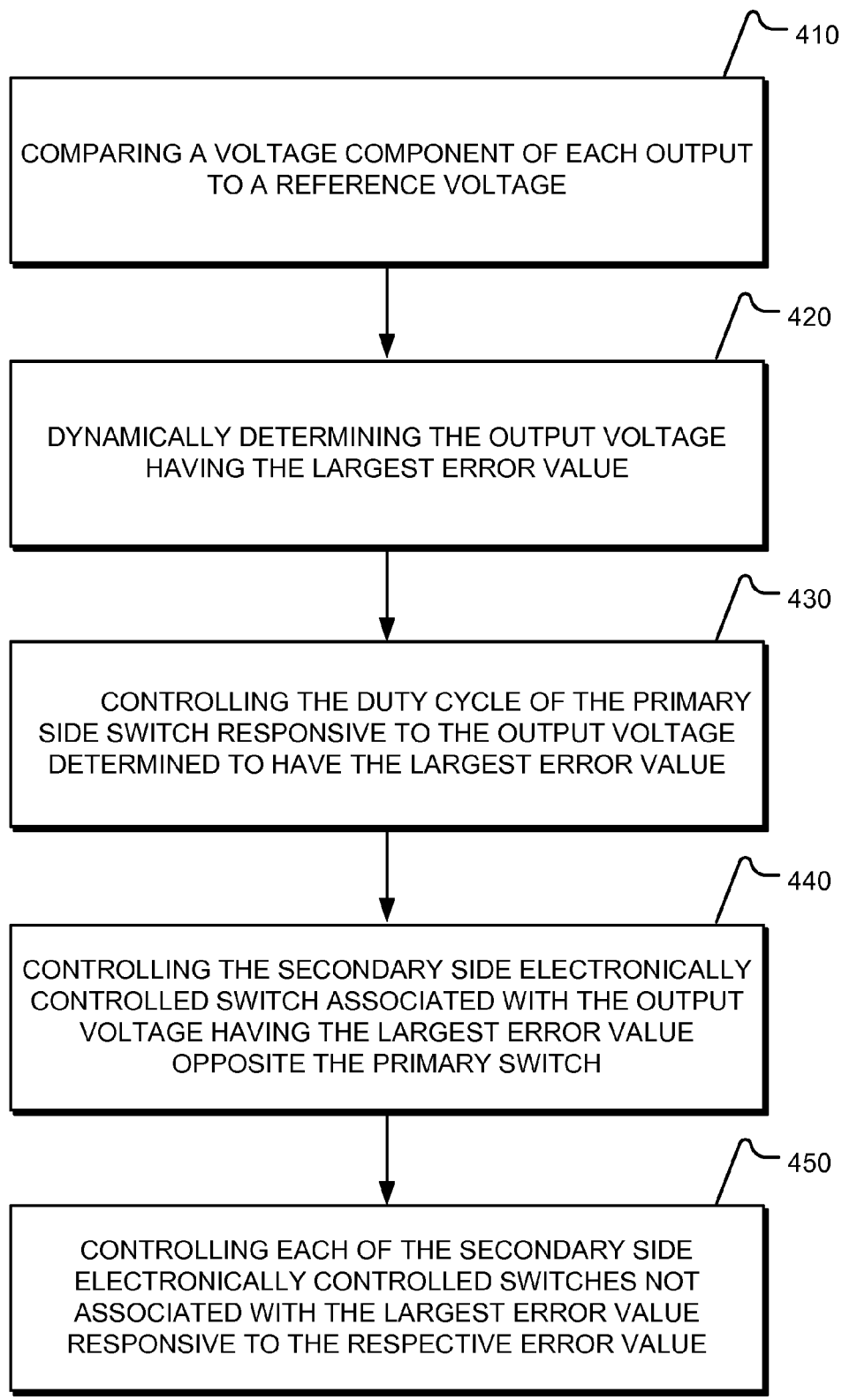
FIG. 4 illustrates a high level flow chart of a method according to an exemplary embodiment.

FIG. 4 is a high level flow chart of an embodiment of a method according to a principle of the present invention. In stage 410, the method comprises comparing a voltage component of each output to a reference voltage. In one embodiment this is done by taking a voltage divided representation of each of the output voltages, where the divided representation normalizes the nominal output voltage values, and comparing the representations to a single reference. In another embodiment, a plurality of references are supplied, each associated with a respective output voltage. In stage 420, the output voltage having the largest error, defined as the largest amount below the nominal value, is dynamically determined.

In stage 430, the duty cycle of the primary side switch is controlled responsive to the determined output voltage having the largest error of stage 420. In stage 440, the secondary side electronically controlled switch having the largest error of stage 420 is controlled to be opposite the opening and closing of the primary switch. In stage 450, each of the secondary side electronically controlled switches not associated with the largest error value, are controlled responsive to their error value.

Thus, the present invention enables secondary side voltage regulation for a multiple output flyback DC/DC converter. In one embodiment the output with the largest error voltage is dynamically selected to be regulated by the primary switch. The remaining outputs are regulated by varying the length of time that current flows into each output by controlling a switch connected in series with each of the outputs.

Preferably, the switching of the windings is achieved using a single N channel MOSFET for each output. Regulation of the outputs is performed using leading edge modulation. The body diode of the output MOSFET switches are held off immediately after the primary switch turns off by the use of an active clamp on the primary side.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

What is claimed is:

1. A controller for regulating the output voltages in a multiple output flyback converter, the converter having a primary electronically controlled switch operatively associated with a primary winding and an active clamp and a plurality of secondary windings electromagnetically coupled to the primary winding, each of the secondary windings operatively associated with a particular one of a plurality of secondary electronically controlled switches and a respective one of a plurality of outputs, each of the plurality of outputs exhibiting an output voltage, the controller comprising:
   a plurality of error circuits, each of said plurality of error circuits coupled to a respective one of the particular outputs and arranged to output an error signal representative of the difference between a predetermined reference voltage and a function of the respective output voltage;
   a comparison circuit arranged to compare each of the output error signals with a time varying signal and output a plurality of comparison signals each reflecting the comparison of a respective one of the output error signals with the time varying signal; and
   a control circuit arranged to control the alternate closing and opening of the primary electronically controlled switch responsive to the dynamically detected output comparison signal associated with the largest of the differences between the predetermined reference voltage and the function of the respective output voltage and to control the closing and opening of each of the plurality of secondary electronically controlled switches responsive to the respective comparison signal.

2. A controller according to claim 1, arranged such that the opening and closing of the primary electronically controlled switch is directly opposite the opening and closing of the respective secondary electronically controlled switch associated with said largest difference.

3. A controller according to claim 1, wherein said control circuit simultaneously opens said plurality of secondary electronically controlled switches prior to closing said primary switch.

4. A controller according to claim 1, wherein said control circuit further comprises a ramp voltage generator arranged to generate the time varying signal and wherein said comparison circuit comprises a plurality of comparators, each of said plurality of comparators associated with a particular one of said output error signals and in communication with said ramp voltage generator, said control of the closing and opening of each of said plurality of secondary switches responsive to a respective comparator.

5. A method of regulating output voltages in a multiple output flyback converter having a primary side electronically controlled switch associated with a primary winding and a plurality of secondary side electronically controlled switches each associated with a particular secondary winding and a particular output, said method comprising:
   comparing a voltage component of each of the particular outputs to a reference voltage to determine a plurality of respective error values;
   comparing each of the respective error values with a time varying signal to produce a plurality of comparison signals each reflecting the comparison of a respective one of the respective error values with the time varying signal;
   dynamically determining the comparison signal reflecting the largest error value;
   controlling the duty cycle of the primary side electronically controlled switch responsive to said dynamically determined comparison signal reflecting the largest error value thereby regulating the output voltage having the largest error value;
   controlling the secondary side electronically controlled switch associated with the output voltage having the largest error value opposite the primary switch;
   controlling each of the secondary side electronically controlled switches not associated with the largest error value responsive to the respective comparison signal to regulate the respective outputs; and
   actively clamping a voltage spike associated with the first electronically controlled switch to a maximum value.

6. The method of claim 5, further comprising:
   opening the plurality of secondary side switches prior to closing the primary side electronically controlled switch.

7. The method of claim 5, wherein said active clamping forces a respective constant voltage at each of the particular outputs when the primary side electronically controlled switch is open, said respective constant voltage being a function of the turns ratio of the respective secondary winding to the primary winding.

8. The method of claim 5, wherein said controlling each of the secondary side electronically controlled switches not associated with the largest error value is by leading edge modulation.

9. A multiple output flyback converter comprising:
   a primary winding;
   a first electronically controlled switch operatively connected to an end of said primary winding and arranged to draw current through said primary winding when said first electronically controlled switch is closed and to interrupt said current through said primary winding when said first electronically controlled switch is open;
   an active clamp operatively connected to said end of said primary winding and arranged to clamp a voltage spike at said end of said primary winding from exceeding a predetermined value;
   a plurality of secondary windings electromagnetically coupled to said primary winding, each associated with a respective output arranged to provide an output voltage;
   a plurality of second electronically controlled switches each connected in series with a respective one of said plurality of secondary windings and arranged to allow current flow through said respective secondary winding when closed; and
   a controller operatively coupled to the control terminal of each of said plurality of second electronically controlled switches, arranged to receive an indication of each of the respective output voltages and in communication with the control terminal of said first electronically controlled switch, said controller comprising:

a plurality of error circuits each of said plurality of error circuits coupled to a respective one of the outputs and arranged to output an error signal representative of the difference between a predetermined reference voltage and a function of the respective output voltage;

a comparison circuit arranged to compare each of the output error signals with a time varying signal and output a plurality of comparison signals each reflecting the comparison of a respective one of the output error signals with the time varying signal; and a control circuit arranged to control the alternate closing and opening of the primary electronically controlled switch responsive to the dynamically detected output comparison signal associated with the largest of the differences between the predetermined reference voltage and the function of the respective output voltage and to control the closing and opening of each of the plurality of secondary electronically controlled switches responsive to the respective comparison signal.

10. A multiple output flyback converter according to claim 9, wherein said controller is further operative to control the opening and closing of the second electronically controlled switch connected to the secondary winding associated with the largest of the differences between the predetermined reference voltage and the function of the respective output voltage opposite the closing and opening of the primary electronically controlled switch.

11. A multiple output flyback converter according to claim 9, wherein said controller is further operative to apply leading edge modulation to each of said secondary electronically controlled switches responsive to an error condition of said respective associated output voltage.

12. A multiple output flyback converter according to claim 9, wherein said control circuitry is further operative to simultaneously open said plurality of second electronically controlled switches prior to closing said first electronically controlled switch.

13. A multiple output flyback converter according to claim 9, wherein said controller further comprises:

a ramp voltage generator arranged to provide the time varying signal; and wherein said comparison circuit comprises a plurality of comparators, each of said plurality of comparators associated with a particular one of said output error signals and in communication with said ramp voltage generator, said control of the closing and opening of each of said plurality of secondary switches responsive to a respective comparator.

14. A multiple output flyback converter according to claim 9, wherein said active clamp forces a respective value for each of said respective output voltages when said first electronically controlled switch is open, said respective value being a function of the turns ratio of said respective secondary winding to said primary winding.

15. A multiple output flyback converter according to claim 9, wherein each of said plurality of second electronically controlled switches comprises a metal oxide semiconductor field effect transistor.

16. A multiple output flyback converter according to claim 9, wherein each of said plurality of second electronically controlled switches comprises a single n-channel metal-oxide-semiconductor field-effect-transistor exhibiting a source terminal, a drain terminal and a gate terminal, wherein said control terminal is represented by said gate terminal, said drain terminal is connected to said respective secondary winding and said source terminal is connected to a common point.

* * * * *